United States Patent [19]

Goff

[11] 4,093,246
[45] June 6, 1978

[54] UNIVERSAL FEED FINGER DEVICE

[76] Inventor: Frederick Goff, Box 773, Rte. 4, Travelers Rest, S.C. 29690

[21] Appl. No.: 823,188

[22] Filed: Aug. 9, 1977

[51] Int. Cl.² .............................................. B23B 31/00
[52] U.S. Cl. ................................................... 279/41 A
[58] Field of Search ............... 279/41 A, 41 R, 46 A, 279/46 R, 9 R, 1 R, 23 A, 23 R, 1 SG

[56] References Cited

U.S. PATENT DOCUMENTS

| | | | |
|---|---|---|---|
| 1,839,432 | 1/1932 | Weed | 279/41 A |
| 2,037,304 | 4/1936 | Baxendale | 279/41 A X |

Primary Examiner—Gil Weidenfeld
Attorney, Agent, or Firm—Bailey, Dority & Flint

[57] ABSTRACT

A feed finger device for holding and feeding a bar of stock material on an automatic screw machine includes a hollow cylindrical finger open at both ends one with one end being adapted for attachment to a feed tube carried by the machine through which the bar is fed. A plurality of elongated closed-ended slots extends obliquely to the longitudinal direction of the cylindrical finger and the cylindrical member is crimped a desired amount intermediate the ends of the slots whereby the feed finger may be made to grip and feed different sizes and shapes of bar stock material without scratching or marring the flats of the bar stock.

5 Claims, 5 Drawing Figures

U.S. Patent
June 6, 1978
4,093,246
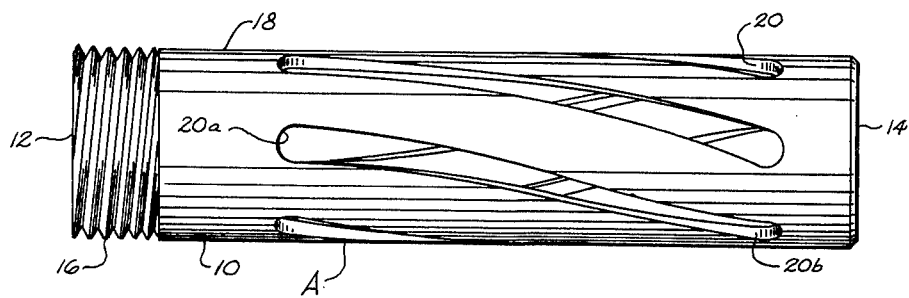
Fig.1
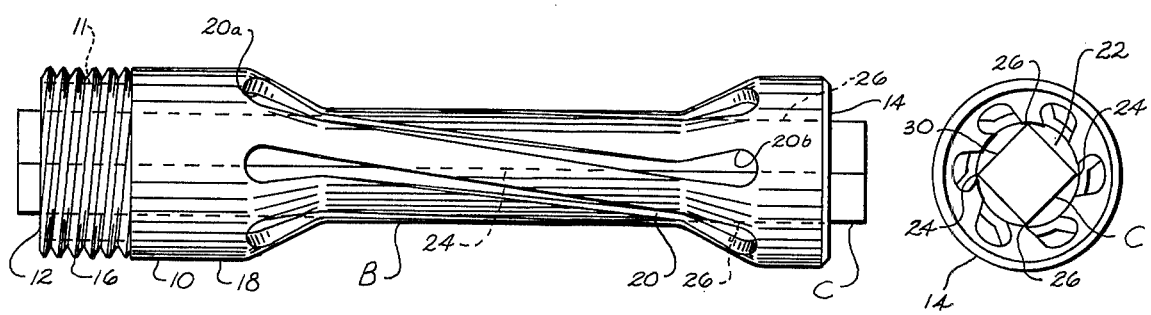
Fig.2
Fig.3
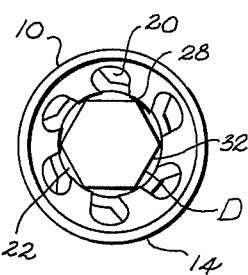
Fig.4
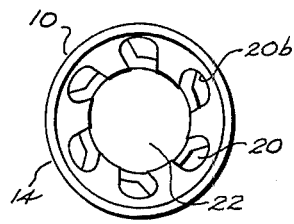
Fig.5

UNIVERSAL FEED FINGER DEVICE

BACKGROUND OF THE INVENTION

Feed fingers are utilized on automatic screw machines and the like for successively pushing or feeding segments of a continuous length of stock material to a collet of the tool. The bar stock is gripped inside the finger which is able to develop sufficient frictional contact therebetween in order to move the bar stock into the collet on the forward stroke, and when engaged by the collet, the feed finger is retracted to its initial position by sliding rearwardly over the bar stock. A machine operation then takes place at the forward end of the bar stock and following the machining operation, the stock is cut off and the feeding operation is repeated. The interior of the feed finger must have some bar engaging surface which will grip the bar to move it forwardly yet will release the bar to slide rearwardly without scratching or marring of the bar stock material. At the same time, it is desirable to have a feed finger which will readily adapt to feeding a variety of sizes and shapes of bar stock material due to the cost of manufacturing such devices.

Prior feed fingers have been proposed having a slot which opens in the front end of the tube so that the forward end of the tube tends to collapse radially for resiliently gripping the bar stock. Other feed devices have been proposed including leaf springs which resiliently grip the bar stock and have adjustable tensioning means provided by a rotatable sleeve which adjusts the leaf springs. However, since the bar stock is gripped by the feed finger only adjacent the front end thereof, these devices require special guide bushings in the rear portion of the feed finger to insure that the bar stock is maintained centered in the feed finger.

Cage-type feed fingers have been heretofore proposed having a plurality of longitudinal slots spaced around the periphery of the finger which are crimped to adapt the feed finger to a particular size and shape of bar stock material. However, these feeders are not entirely suitable for hex, square or rectangular shaped bar stock since the edges or corners of such stock fit in the slots and the crimped flats often mar and scratch the flats on which they bear. As a result, cage-type pushers are generally used only for round stock.

SUMMARY OF THE INVENTION

It has been found that a universal feed finger device for feeding a variety of sizes and shapes of bar stock material on an automatic screw machine can be provided by a cylindrical member having a hollow interior and two open ends. One end of the feed cylinder is adapted for attachment to the feed tube of the tool machine through which the bar stock is fed. A helical cage is defined by a plurality of elongated closed-ended slots extending obliquely to the longitudinal direction of the feed cylinder and the cylinder is crimped in a section between the ends of the helical slots to a desired size for resiliently gripping the bar stock of material. The bar stock of material extends longitudinally through the feed finger at an angle to the helical slots so that the edges of the bar stock are not able to slide within one of the slots. Since the feed finger is crimpable to any desired size, a wide range of sizes and shapes of bar stock material may be utilized with the feed finger.

Accordingly, an important object of the present invention is to provide a universal feed finger which may be utilized for feeding a wide range of sizes and shapes of bar stock material on an automatic screw machine.

Another important object of the present invention is to provide a feed finger for feeding a bar stock which reduces the amount of scoring, scratching, and marring of the stock material when being fed thereby.

Another important object of the present invention is to provide a feed finger device for feeding bar stock material which is economical and may be adapted to fit a wide range of bar stock sizes and shapes without the need of special guide bushings.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a side elevational view illustrating a feed finger device constructed in accordance with the present invention;

FIG. 2 is a side elevational view of the feed finger of FIG. 1 after it has been crimped to hold and feed a certain size of bar stock;

FIG. 3 is an end view of the feed finger device of FIG. 2 wherein a square bar of stock material is held for feeding;

FIG. 4 is an end view of the feed finger device according to the invention wherein a hex bar of stock material is held for feeding; and FIG. 5 is a front end view of the feed finger device of FIG. 2 which is crimped wherein the bar of stock material is admitted for purposes of illustrating the interior of the feed finger device.

DESCRIPTION OF A PREFERRED EMBODIMENT

The invention relates to the automatic feeding of bar stock material on automatic screw machines and the like wherein a bar of stock material is held within the feed finger with the feed finger being mounted on the end of the feed tube. Since automatic screw machines are conventional and well known, it is unnecessary to illustrate a screw machine herein as the utilization of a feed finger disclosed herein will be apparent to the average machinist or screw machine operator. Accordingly, only the feed finger device itself is illustrated in the drawings disclosed herein. It is to be understood of course, that the feed finger device according to the invention may also have application to other metal working machines besides automatic screw machines.

Illustrated in FIG. 1 is a feed finger device 10 having a hollow interior bore 11 being open at both of its ends 12 and 14. The end 12 of the feed finger is adapted for attachment to the feed tube of the screw machine and for this purpose is provided with suitable threads 16 for mating with the internal threads of the feed tube.

The main cylindrical body portion 18 of the feed finger includes a helical cage A defined by a plurality of elongated closed-ended helical slots 20 extending obliquely to the longitudinal direction of the cylindrical feed finger. As illustrated, the slots 20 are of equal length and width and are parallel to each other. Each slot includes a closed end 20a and 20b.

The feed finger is crimped in a section B intermediate the closed ends 20a and 20b of the helical slots to provide a crimped section of reduced diameter in which the bar stock material is frictionally engaged for feeding. In the illustrated embodiment, the oblique grooves 20 form an angle of approximately fifteen degrees with the longitudinal axis of the cylindrical feed finger.

As illustrated in FIGS. 2 and 3, the side corners 24 of the square bar stock C engage the inside of the crimped bore 22 and cross the oblique slots 20 at an angle of approximately fifteen degrees as does the top edges of the bar at 26. There is no likelihood that the edges or corners of the bar stock being fed will fall into the slots in the crimped section. Therefore, the chances that any sliding of the feed finger 10 relative to the bar stock C will result in scratching or marring of the stock material are virtually eliminated. The same is true for the hex bar stock D shown in FIG. 4, wherein the corners 28 will uniformly engage the crimped bore 22 and cross the oblique slots 20 whereby scratching of the stock material adjacent the corners of the slot is eliminated.

It will be noted that at no time are the flat surfaces 30 of the square stock or the flat surfaces 32 of the hex stock engaged by the feed device in the crimped section in which it is held. Thus, the likelihood that the flat surface of the bar stock will become scratched or marred is effectively minimized. Scratching of the corners normally result in only a rounded or polishing effect which is not noticeable and does not usually create a defective appearance. The feed finger of the present invention is particularly useful when used for feeding bar stock material which is chrome plated. Scratches and marring on chrome plated material is highly exaggerated and most readily visible. The feed finger of the present invention will be recognized as an expedient in feeding symmetrical bar stock of any configuration.

Any suitable method may be utilized for crimping the helical cage section A. One suitable method is provided by placing the finger 10 in a six jaw lathe chuck modified by grinding the jaw edges slightly so that the jaws cover and engage each of the helical sections uniformly. One such suitable chuck is manufactured by the Buck Tool Company of Kalamazoo, Michigan. An undersized arbor is inserted into the bore 11 of the finger during crimping so that the diameter of the crimped bore 22 of the feed finger is crimped approximately 1/64 of an inch smaller than the cross-sectional diagonal of the bar stock.

It will be noted that the illustrated helical slots 20 are inclined downwardly from the left to the right to define a right-hand helix. When used on a right-handed screw machine, rotation will be in the direction of the helix and the tendency of the feed device will be to maintain or tighten its grip on the bar stock material as it is held by the collet and rotated. Accordingly, when utilized on a left-handed screw machine the helical slots 20 will be formed in a left-hand helix.

While the slots 20 may be formed in a number of suitable ways, one suitable method is to generate the slots on a vertical milling machine wherein the table moves longitudinally as the cylindrical member 10 rotates one-sixth of a revolution per each slot cut. Thus, a helical cage having six oblique slots 20 is illustrated as an example, larger feed fingers may require eight or more slots.

Thus it can be seen that a highly advantageous construction for a universal feed device can be had in accordance with the present invention which may be crimped to a predetermined size for feeding a certain sized and shaped bar stock material to an automatic screw machine. The feed device may be crimped by the manufacturer and supplied as ordered or the device may be crimped by the machinist in the shop. The inclination of the helical slots prevents the edges of the bar stock from falling into the slots so as to eliminate any scratching or marring of the flat surfaces of the bar stock. Any symmetrically shaped bar stock may be positively held and fed by utilizing a feed finger device according to the invention.

While a preferred embodiment of the invention has been described using specific terms, such description is for illustrative purposes only, and it is to be understood that changes and variations may be made without departing from the spirit or scope of the following claims.

What is claimed is:

1. A feed finger for gripping and feeding a bar of stock material on an automatic screw machine and the like comprising:
   an elongated cylindrical member having a hollow interior and being open at both ends thereof;
   one end of said cylindrical member adapted for attachment to a feed tube of said machine through which said bar stock is fed;
   a plurality of elongated closed-ended slots extending obliquely to the longitudinal direction of said cylindrical member to define a helical cage; and
   said cylindrical member being crimped in a section intermediate the closed ends of said helical slots defining a crimped bore in which said bar stock is gripped.

2. The device set forth in claim 1 wherein said helical slots are parallel and circumferentially spaced about said cylindrical member.

3. The device set forth in claim 1 wherein said helical slots are inclined downwardly in the direction of rotation of said stock material when rotated on said metal working machine.

4. The device set forth in claim 1 wherein the diameter of the crimped bore of said cylindrical member is less that the cross-sectional diagonal of the stock material being fed.

5. The device set forth in claim 1 wherein said slots are of equal length and width.

* * * * *